Figure 3:
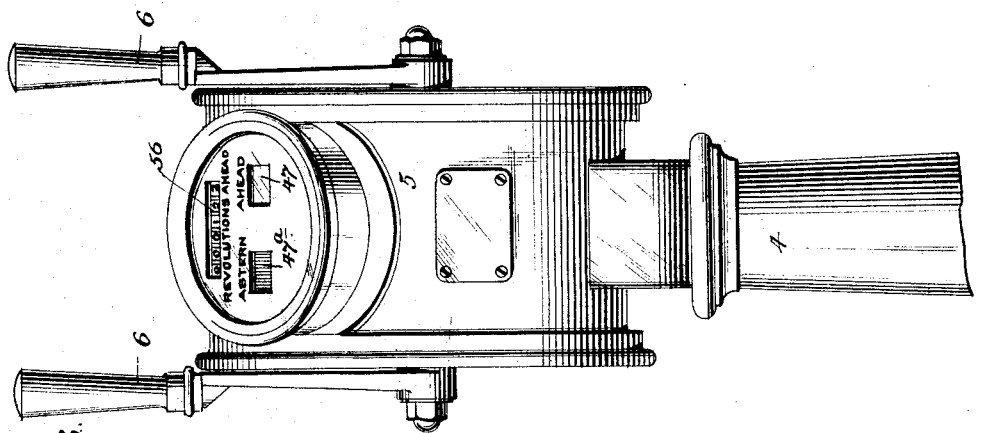

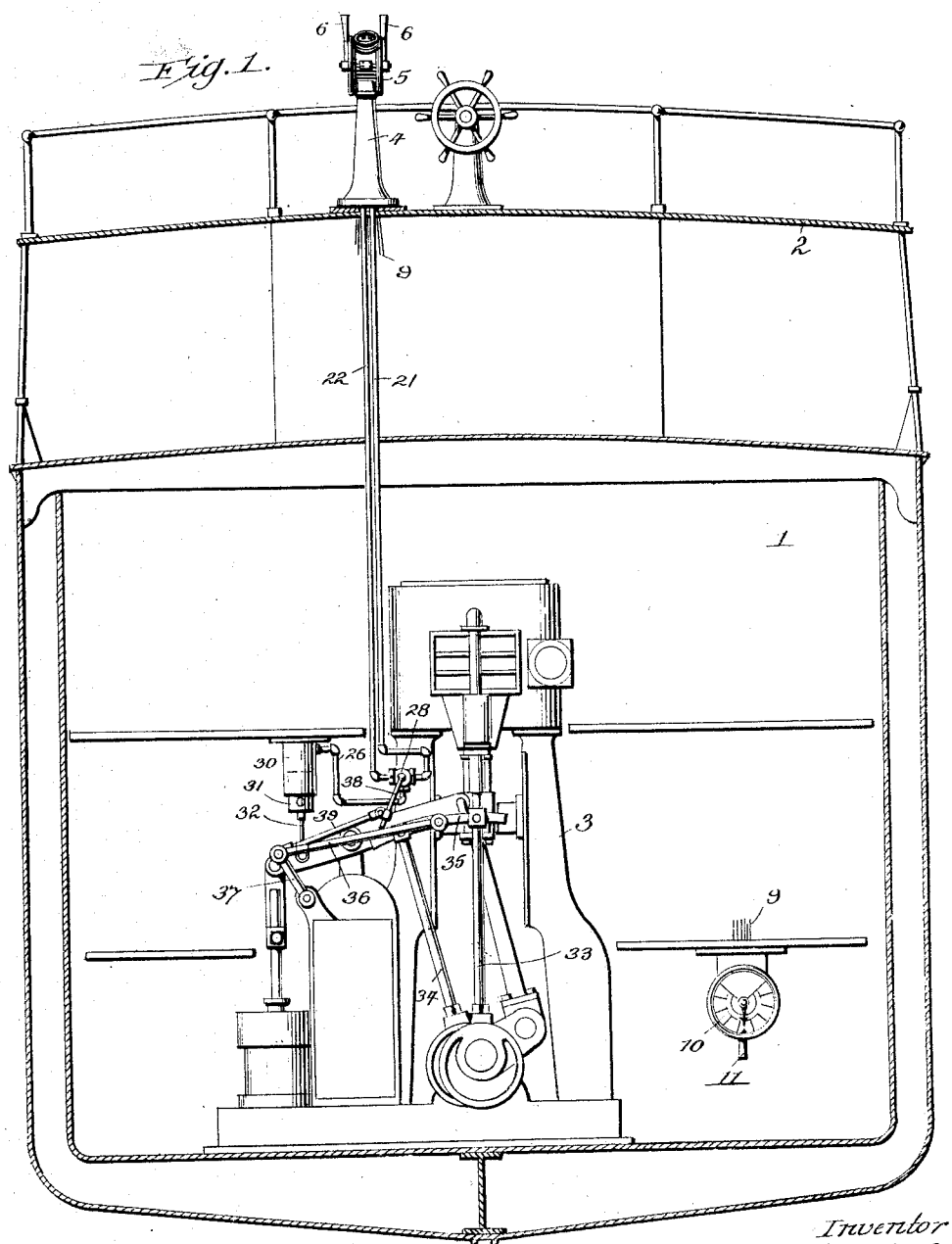

A. McNAB.
DIRECTION INDICATING AND REGISTERING MECHANISM.
APPLICATION FILED MAY 1, 1918.

1,369,682.

Patented Feb. 22, 1921.
4 SHEETS—SHEET 2.

Inventor
Alexander McNab,
By Dodge and Sons,
Attorneys

A. McNAB.
DIRECTION INDICATING AND REGISTERING MECHANISM.
APPLICATION FILED MAY 1, 1918.

1,369,682.

Patented Feb. 22, 1921.
4 SHEETS—SHEET 3.

Inventor
Alexander McNab,

By Dodge and Sons,

Attorneys.

A. McNAB.
DIRECTION INDICATING AND REGISTERING MECHANISM.
APPLICATION FILED MAY 1, 1918.
1,369,682. Patented Feb. 22, 1921.
4 SHEETS—SHEET 4.
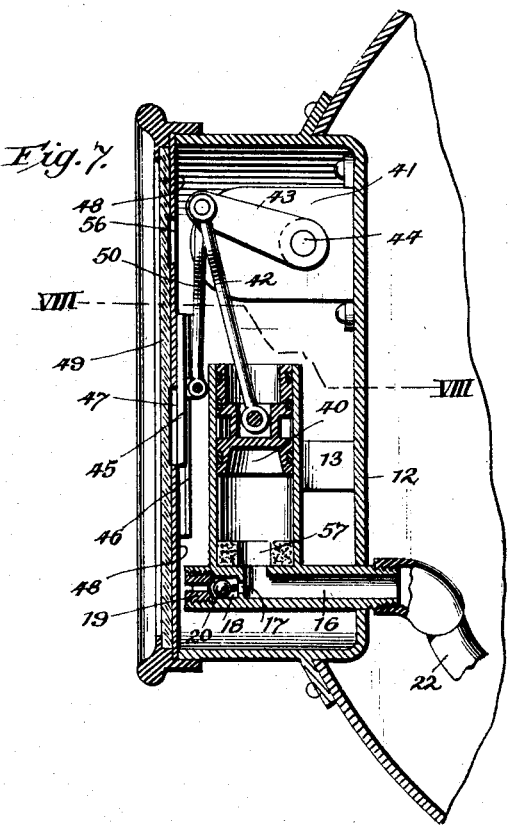
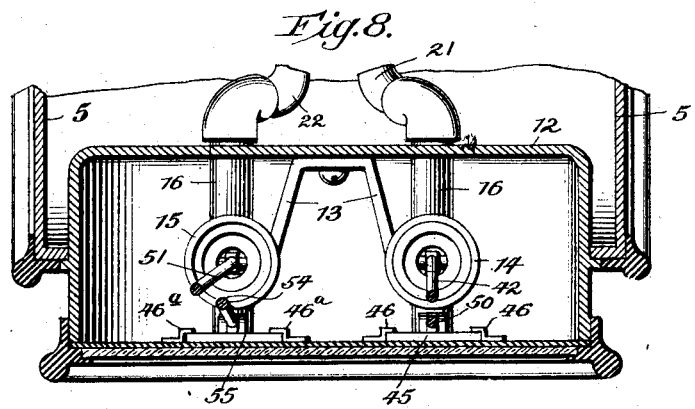
Inventor
Alexander McNab,
By Dodge and Sons,
Attorneys

UNITED STATES PATENT OFFICE.

ALEXANDER McNAB, OF BRIDGEPORT, CONNECTICUT.

DIRECTION INDICATING AND REGISTERING MECHANISM.

1,369,682.  Specification of Letters Patent.  Patented Feb. 22, 1921.

Application filed May 1, 1918. Serial No. 231,939.

*To all whom it may concern:*

Be it known that I, ALEXANDER MCNAB, a subject of the King of Great Britain, residing at Bridgeport, in the county of Fairfield and State of Connecticut, have invented certain new and useful Improved Direction Indicating and Registering Mechanism, of which the following is a specification.

My present invention pertains to an improved direction indicating and registering mechanism for use upon ships, and is designed particularly to enable the navigating officer to readily transmit orders to the engine room and know at once whether such orders are being correctly carried out.

The invention in a sense is an improvement upon the structure set forth and claimed in Letters Patent of the U. S. granted to me under Nos. 1,010,662, dated December 5, 1911, and 1,024,452, dated April 23, 1912. The present invention, however, differs from said prior devices in many respects and more particularly in the embodiment in a single frame or instrument, of the so-called "ship's telegraph or direction indicator" by which the navigator's orders are transmitted to the engine room, and a visual, engine actuated indicator and revolution register, whereby the navigator may not only know by the bringing of the engineer's indicating hand or pointer into registry with the sending lever through a manual operation on the part of the engineer, that his orders have been noted and understood in the engine room, but also see by the actuation of the engine controlled and actuated indicator that his orders are being carried out as directed.

The invention has for its further object the provision of an improved actuating means for the visual engine controlled indicators,—ahead and astern,—and also to make provision for the automatic introduction of air into the line located between the actuator, driven by the engine, and the visual indicator.

A structure embodying the invention is illustrated in the annexed drawings, wherein,—

Figure 2:
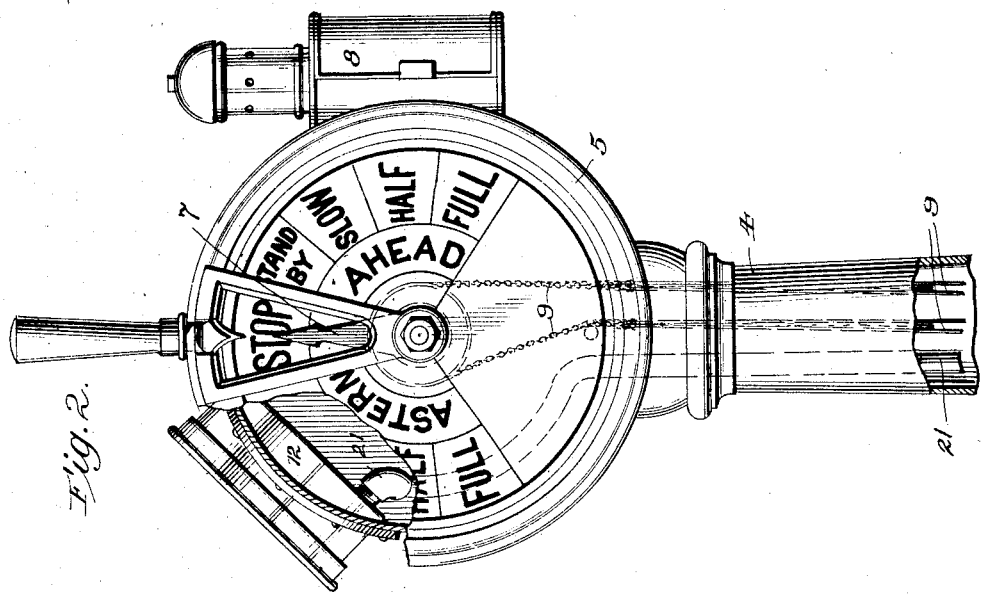
Figure 4:
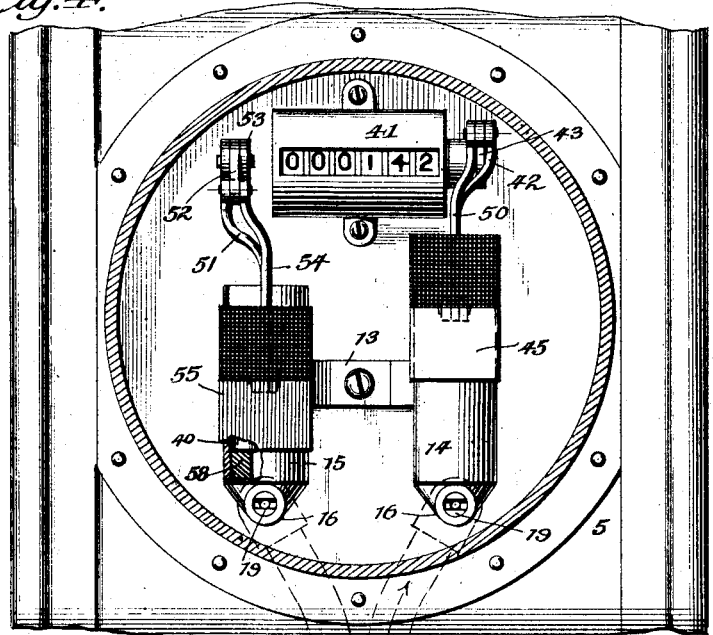
Figure 5:
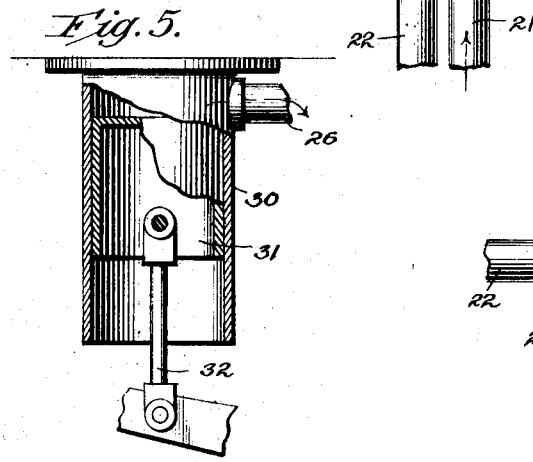
Figure 6:
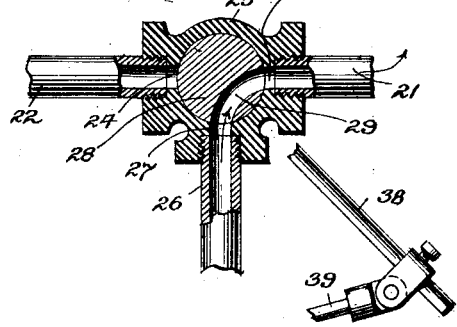

Figure 1 is a sectional elevation of a ship showing the indicator, the engine, and the connections between the parts, the structure being somewhat diagrammatically illustrated and not to scale;

Fig. 2 a side elevation, partly in section, of the combined signal sending stand and indicator;

Fig. 3 a front elevation thereof;

Fig. 4 a front elevation, with the cover removed, and on an enlarged scale, of the visual indicators and the revolution register;

Fig. 5 a detail sectional elevation of the impulse motor;

Fig. 6 a similar view of the air control valve;

Fig. 7 a vertical sectional view taken through the actuating mechanism of the "ahead" visual indicator, and Fig. 8 a horizontal section on the line VIII—VIII of Fig. 7.

In the drawings 1 denotes the ship or vessel, 2 the bridge thereof and 3 the engine. The telegraph—so-called—may be of any approved form, that indicated being of the "Chadburn" type having a pedestal 4 surmounted by a signal transmitter comprising a head or casing 5 provided with the usual side dials, control levers or handles 6, indicating hands 7 and lamp box 8.

The control levers are connected by the usual chains and wires 9 with the signal indicating mechanism 10, (Fig. 1) located in the engine room. The lever 11 of said indicator is connected with the indicating hands 7 of the transmitter whereby the engineer may operate the hands to show that the order given has been received and understood.

The head or casing (see Figs. 2, 4, 7 and 8) is provided on its forward side with an opening into which is set and secured a box or chamber 12 which forms the support and housing for the visual indicators, and the shaft revolution counter, the counter being employed in the present instance to show the revolutions of the propelling screw in a forward direction only.

Extending outwardly from the rear wall of the housing is a bracket 13, said bracket supporting two cylinders 14 and 15. Said cylinders are alike in form and each is provided with an opening in its lower end from which extends a branch pipe or nipple 16. Said pipe in addition to opening into the cylinder is provided with a port 17 (Fig. 7) which opens into a valve chamber 18 having a perforate plug 19 mounted in the outer end or portion thereof. A valve 20 mounted in said chamber is adapted to seat against the plug and to thereby prevent egress of air therethrough while permitting air to enter when suction is produced in the system by the actuator presently referred to. Pipes 21 and 22 extend from the respective nipples 16, said pipes being connected respectively to oppositely disposed ports 23 and 24 formed in a valve casing 25. A third pipe 26 extends from a third port 27 and is adapted to be brought into communication with one or the other of ports 23, 24, by an oscillating valve 28 having a single connecting channel or way 29. Pipe 26 at its opposite end opens into the upper end of a cylinder 30 in which is mounted a piston 31 connected to and actuated by a link 32 which in turn is attached to a working portion of the engine so that the pump or actuator, comprising the cylinder and piston, is operated at each stroke of the engine. The valve gear is of the usual type having eccentric rods 33, 34, and a link 35, the latter being connected by a rod 36 to the arm 37 of the valve gear. Secured to and extending from the valve 28 is an arm or lever 38 which in turn is connected by a rod 39 to the arm 37 of the valve gear. When the valve gear is thrown over to the right to reverse the engine and shaft, the arm 37 moves to the right and thus turns the valve 28. Thus as the valve gear is in one or another position the channel 29 will be thrown into communication with the main supply pipe 26 and the pipe 21 or 22, as the case may be, permitting the air which is forced outwardly by the piston 31 and through the pipe 26 to pass to the pipe 21 or 22 and to thus actuate the piston 40 in the cylinder 14 or 15, according as valve 28 is moved in one or the other of its positions. In passing into the lower end of the cylinder through branch 16 from the actuator, the air will cause the valve 20 to move outwardly against the seat formed upon the inner face of the plug 19, and consequently the confined and moving body of air will cause piston 40 to be elevated. Upon a downward movement of piston 31 if there has been any escape of air from the line the valve 20 will open and admit air to the line, thus supplying any deficit and insuring a proper volume so that upon the next upstroke of the actuator piston 31, piston 40 will be moved upward to its full extent. The pistons mounted in the cylinders 14 and 15 are alike in form and the operation of the two is identical except in so far as the piston working in the cylinder 14 is connected up with the revolution counter 41. The piston mounted in the cylinder 14 is provided with a pitman 42, pivotally connected at its upper end to an arm or lever 43 secured to an arbor 44 of the revolution counter 41. This counter may be of the usual type wherein for each impulse of the piston, and consequently for each revolution of the shaft and screw, the register or counter will be moved forward one point or number. The visual indicator comprising a slide 45 mounted in suitable ways 46 is located in line with an opening 47 formed in the supporting plate 48 which is mounted in rear of the transparent cover 49 in the forward portion of the housing 12. Said slide is connected by a link 50 to the arm 43 and consequently partakes of the motion of said arm and the actuating piston 40. By preference, a portion of the slide 45 will be left white, while the upper portion thereof will be of somewhat contrasting color, as red, as indicated in Fig. 4. The piston 40 mounted in the cylinder 15 is connected by a pitman 51 to the outer end of a lever 52 fulcrumed in a lug or bracket 53 extending forwardly from the rear face of the box or housing 12. A link 54 is likewise pivotally connected to said arm or lever 53, said link at its lower end being connected to a slide 55 mounted in ways 46ᵃ movable up and down past an opening 47ᵃ. This slide, preferably, has contrasting colors placed thereon, as indicated in Fig. 4 of the drawings, in order that the navigating officer may more readily see the movement of the slide as one or another color comes opposite the opening. An opening 56 will be placed in line with the revolution counter or register. As shown in Fig. 7 a felt washer 57 may be located in the lower portion of the cylinder 14 in order that as the piston 40 drops, as it does when the piston 31 of the actuator is moved downwardly, it may come to rest without making any noise. A washer 58 (Fig. 4) of hard material may be placed in the bottom of the cylinder 15 so that as the piston in said cylinder drops it will produce an audible signal.

As will be at once appreciated, the apparatus affords the navigating officer all the information that is necessary to be assured that the engineer has fully understood his orders and that such orders are being carried out.

When the vessel or ship is moving astern it is not essential for the navigating officer to know how many revolutions the screw is making, and, consequently, I have omitted any revolution counter in connection with the astern visual indicator as it is found that the visual indicator, together with the audible signal produced by its operation is all sufficient to insure proper manipulation or handling of the ship or vessel. It is likewise to be noted that the air in the line is merely a confined body of air and that there is no compressed air employed in this apparatus, nor any vacuum. In other words, the air in the pipe lines may be said to be merely agitated or translated through the line by the action of piston 31.

The bringing together of the signal transmitting mechanism, the visual indicator and the revolution counter in a single instrument, enables the navigating officer to at once know exactly what is transpiring in the engine room and he is thus enabled to navigate the ship with certainty and precision. The revolution counter enables the navigating officer to determine the speed of travel of the ship and the distance the ship has traveled during any given period and, in a sense, acts as a log.

While the signal transmitter is shown as located on the bridge, it is evident that such location is not essential to the invention—it might well be located in the pilot house.

I claim—

1. In an apparatus of the character specified, the combination of a visual indicator; a cylinder; a piston working therein; connections between said piston and the indicator for actuating the latter; an air pump connected to and operated by the ship's engine; a pipe line extending directly from the pump to the lower portion of the cylinder; and an air inlet valve adapted to admit air into the line upon a retrograde movement of the pump.

2. In an apparatus of the character specified, the combination of a visual indicator; a revolution counter; a cylinder; a piston working therein; actuating connections between the piston and the indicator and revolution counter; an air pump connected to and operated by the ship's engine; a pipe line extending directly from the pump to the lower portion of the cylinder; and an air inlet valve adapted to admit air into the line upon a retrograde movement of the pump whereby the volume of air within the line is kept constant and maintained at atmospheric pressure.

3. In an apparatus of the character specified, the combination of a visual indicator; a cylinder; a piston working therein; connections between said piston and indicator; an engine actuated pump; a line extending directly from the pump to the lower end of the cylinder; and an outwardly closing check valve opening into the line between the cylinder and pump, whereby the body of air is maintained constant and at atmospheric pressure at all times within the line.

In testimony whereof I have signed my name to this specification.

ALEXANDER McNAB.